United States Patent [19]

McMann, Jr. et al.

[11] 4,205,310
[45] May 27, 1980

[54] TELEVISION TITLING APPARATUS AND METHOD

[75] Inventors: Renville H. McMann, Jr., New Canaan; Joseph Bakach, Bridgeport, both of Conn.

[73] Assignee: Thomson-CSF Laboratories, Inc., Stamford, Conn.

[21] Appl. No.: 908,084

[22] Filed: May 22, 1978

[51] Int. Cl.² ............................................. G06K 15/20
[52] U.S. Cl. ..................................... 340/750; 340/751; 340/800
[58] Field of Search ......................... 340/751, 750, 800

[56] References Cited

U.S. PATENT DOCUMENTS

| 3,665,450 | 5/1972 | Leban | 340/751 |
| 4,090,188 | 5/1978 | Suga | 340/751 |

*Primary Examiner*—David L. Trafton
*Attorney, Agent, or Firm*—Martin Novack

[57] ABSTRACT

The disclosure relates to a television titling apparatus which is substantially the same as a conventional television titling apparatus designed for left-to-right character presentation, but includes a novel subsystem and method which can be utilized to effect display of characters from right-to-left for languages which so require. Reverse image stroke representations are stored in a stroke generator. An auxiliary storage is provided for storing a scanline of stroke bits from the stroke generator. Scanlines of stroke bits are read out of the auxiliary storage in reverse order from the order in which they were read in; i.e., on a last-in-first-out basis. Preferably, the auxiliary storage includes first and second stores which are alternately operable to read in and read out successive scanlines of stroke bits so that one scanline of stroke bits is being read out while the next scanline of stroke bits is being read in.

10 Claims, 2 Drawing Figures

TELEVISION TITLING APPARATUS AND METHOD

BACKGROUND OF THE INVENTION

This invention relates to television tilting apparatus that receives digital input signals corresponding to title information and generates video signals for displaying the information in readable form and, more particularly, to an apparatus of the stated type which is readily and efficiently adaptable to present languages which read right-to-left as well as languages such as English which read left-to-right.

Systems for converting digital title information into video signals that are suitable for display in readable form are currently in widespread use. These systems are employed, for example, to provide title information alone on a display screen, such as is typically done with financial data. Title information may also be generated for display in conjunction with conventional television picture information. This is generally accomplished by combining the video picture signal and the video title signal using known keying techniques.

A system that receives digitally coded characters and generates character video signals suitable for display using a television raster scanning pattern is disclosed in the U.S. Pat. No. 3,422,420. In this system the received digitally coded input character signals to be displayed in a row are stored in ordered positions in recirculating shift registers. Various timing signals, synchronized with the display scan, are generated in repetitive sequences and effectively divide the display scan into a plurality of "character space areas" of predetermined equal size. A character pattern or outline trace is formed in a character space area on the display device by blanking and unblanking the scanning beam as the beam traverses the display device. Thus, each character is formed on the display as a series of "slices" or "strokes" during successive scanlines. The character signals are read out of the recirculating shift registers one at a time, and a "character generator" subsystem generates the appropriate video stroke signals (blanking and unblanking commands) which are distinctive of the character being read out. The timing signals control the shifting and reading out of the character signals in the recirculating registers such that a new character signal is read out each time the display scan passes into a new character space area. After being read out, each character signal is restored in the recirculating registers to be recalled during the next display scanline when the next strokes of each character in the display row are generated. The retentivity of vision of the eye is relied upon to build up the impression of a complete character from the separate character strokes that are produced during each scanline.

In the U.S. Pat. No. 3,740.743 there is disclosed a television-compatible titling apparatus which generates proportionally spaced characters for display; i.e., characters which have different sized "character spaces". For example, a "W" has allotted a substantially larger character space than an "I". In the apparatus of the '743 patent the recirculating storage is shifted in response to spacer timing signals generated by a spacer detector which is responsive to the character signals and includes means for generating spacer timing signals which are a function of the width of the character to be instantaneously displayed. A stroke generator which is responsive to the timing signals and the spacer timing signals generates a stroke of a character being instantaneously displayed.

In both of the above-referenced television titling systems, the description is set forth in terms of a left-to-right display of characters, as is conventional for English and many language presentations. However, there are a number of important languages, such as Arabic, Hebrew, Farsi, etc., used in countries which have a need for television tilting equipment, that require a presentation of characters from right-to-left. It should be readily thought possible to design a television tilting system, modeled for example after the types of system previously referenced, which is capable of displaying characters from right-to-left. However, any such new design endeavor would ostensibly require substantial differences in the system design and structure, resulting in an attendant cost and inefficiency of having two different system structures which are not interchangeable. In this regard, it would be particularly useful to be able to have a basic system which could be used for both left-to-right and right-to-left languages without undue modification or expense. The problem of achieving this object is particularly acute in the type of titling system disclosed in the above-referenced U.S. Pat. No. 3,740,743 wherein proportionally spaced characters (which utilize different sized "character spaces") are employed. In such case, where the characters to be displayed right-to-left are of differing widths, characters cannot be readily exchanged from place to place without regard for their individual size (as might be the case in a non-proportional-spaced character system).

It is an object of the present invention to provide television titling system which is responsive to the stated problem.

SUMMARY OF THE INVENTION

The present invention relates to a television titling apparatus which is substantially the same as a conventional television tilting apparatus designed for left-to-right character presentation, but includes a novel subsystem and method which can be utilized to effect display of characters from right-to-left for languages which so require. The invented subsystem and method can be utilized in conjunction with any suitable television titling apparatus, but is particularly advantageous for use in conjunction with television titling apparatus of the proportionally-spaced character type. In particular, the present invention is applicable to an apparatus which receives a sequence of character-representative signals and which generates video control signals that are suitable for controlling a scanned display to present the sequence of characters on the display. The apparatus includes timing generator means for generating timing signals which are synchronized with the display scan, and character storage means for storing the character-representative signals and periodically reading out character-representative signals which correspond to a character in the sequence. The apparatus to which the invention is applicable also includes stroke generator means responsive to the timing signals and the character-representative signals for producing stroke bits of the character to be displayed.

The present invention is directed to a compatible subsystem for presenting, using an apparatus of the type just described, characters of a language which read right-to-left. In accordance with the invention, means are provided for storing, in the stroke generator means, reverse image stroke representations of a font of characters of the particular language. Auxiliary storage means are provided for storing a scanline of stroke bits from the stroke generator means. Further means are provided for reading out the scanline of stroke bits from the auxiliary storage means, the scanline of stroke bits being read out in reverse order from the order in which they were read into the auxiliary storage means.

In the preferred embodiment of the invention, the auxiliary storage means includes first and second storage means which are alternately operable to read in and read out successive scanlines of stroke bits so that one scanline of stroke bits is being read out while the next scanline of stroke bits is being read in.

Further features and advantages of the invention will become more readily apparent from the following detailed description when taken in conjunction with the accompanying drawings.

DESCRIPTION OF THE PREFERRED EMBODIMENT

Figure 1:
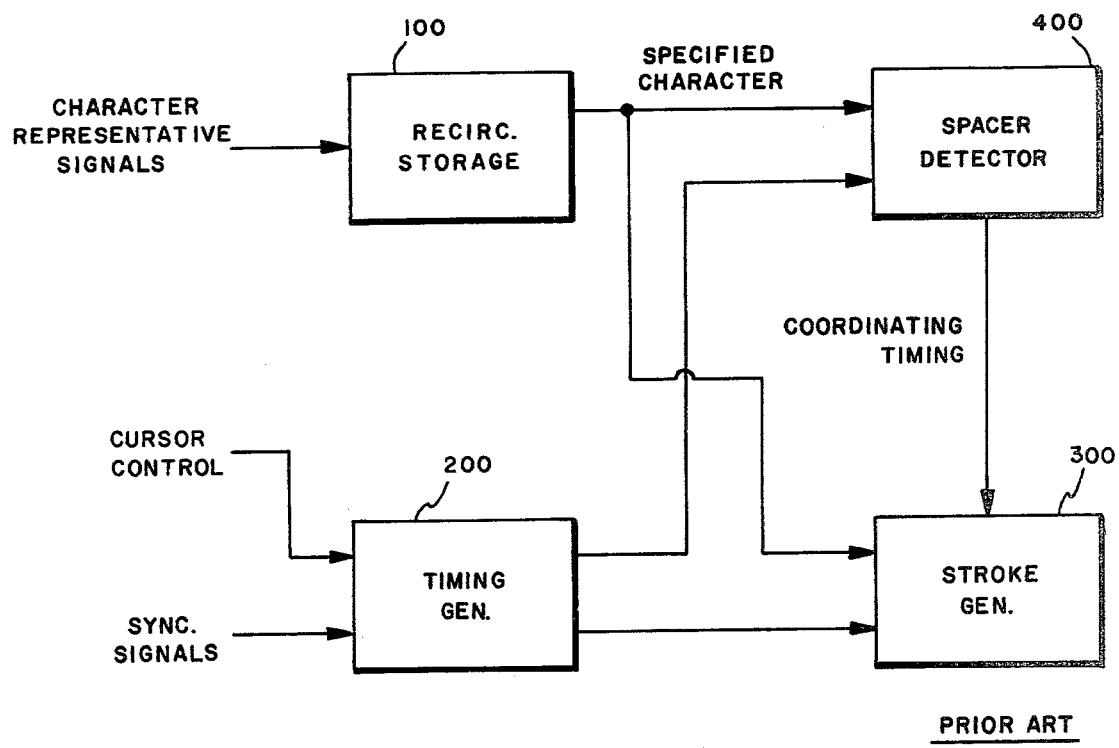
FIG. 1 is a simplified block diagram of a prior art television-compatible titling apparatus.

Referring to FIG. 1, there is shown a simplified block diagram of a television-compatible titling apparatus of the type disclosed in the above-referenced U.S. Pat. No. 3,740,743. An input sequence of character representative digital signals is received by a storage means 100, such as a bank of recirculating shift registers or a random access memory (RAM). The input-character representative signals are typically derived from a keyboard, but may also be derived from a computer or any suitable source. In a particular embodiment described in the above-referenced patent, the storage means 100 includes a six level shift register having a plurality of stages, the number of stages being determined by the maximum number of characters to be ultimately displayed in a row on a display device, for example twenty stages. The purpose of the storage means 100 is to "call-up" a character at a time when a stroke thereof is to be presented, this typically occurring once during each of a sequence of scan lines which depend upon the position on the display at which the particular character is to be reproduced. Upon the appropriate commands, the six bits representative of the character in the last stage of the shift register are read out and then restored to the first stage of the register to be recirculated. The character read out is referred to as the "specified character" and its representative bits or signals are referred to as the "specified character signals". This is the character whose stroke is to be generated at a particular reference time.

A timing generator means 200 receives synchronizing signals related to the composite television signal to be generated; viz., the vertical and horizontal sync signals. The timing generator means includes basic clock, such as a 10 megacycle keyed oscillator which generates clock pulses every hundred nanoseconds. The oscillator is keyed by the horizontal sync signal. The timing generator also includes various counters which keep track of the number of lines scanned by the display up to a given time. When the video scan is in an area in which the row of characters is to be displayed, the counters produce signals that indicate which line of the row is being scanned. As described in the referenced patent, the timing generator 200 includes a cursor control which determines the relative position on the ultimate display at which a new character (entered from the keyboard) is to be positioned. The present position of the cursor is indicated by a small dot on the ultimate display.

A stroke generator 300 receives the specified character signals and line information from the timing generator means, and in response thereto generates stroke bits suitable for controlling an ultimate display to produce the appropriate stroke of the specified character. The stroke generator means typically includes a memory, such as a "read only memory" (ROM) or a "random access memory" (RAM) which is addressed by the received character information and by line information. For example, if the received information indicates that the specified character is a capital "M", and that the present scanline is the top line of the "M", then the memory output stroke bits will be sequential signals instructing the ultimate display scanning beam to turn "on" and then "off" two times in succession to produce the top slice of an "M". As described in the referenced patent, the stroke generator also includes a second ROM that is used to generate the stroke bits which present the cursor dot on the display. During the line and horizontal reference corresponding to the cursor position, stroke bits are generated which present the dot on the display. It will be understood that the stroke generator can be of any suitable form and can produce output bits of any suitable code.

The specified character signals are also received by a spacer detector 400 which determines the width of the specified character and generates a spacer timing signal which depends upon the time when the horizontal scan passes out of the display area needed to produce the specified character. The spacer timing signals are used to shift the recirculating storage 100 so that the next character in the sequence becomes the new "specified" character in the last stage of the recirculating storage 100. The appropriate stroke of the new specified character is then generated. The spacer detector also generates a coordinating timing signal, synchronized with the spacer timing signal, for controlling the timing associated with the generation and readout of stroke bits. For further details of operation, reference is made to the above-referenced U.S. Pat. No. 3,740,743, it being understood that only those portions of a prior art titling apparatus which are necessary for understanding of the present invention have been described herein. Also, it will be appreciated that while the present invention is particularly applicable to the type of system disclosed in the '743 patent, it also applies to various types of titling equipment (with or without a "spacer detector" and proportional spacing), and the system of the referenced patent is utilized for purposes of illustration only.

Figure 2:
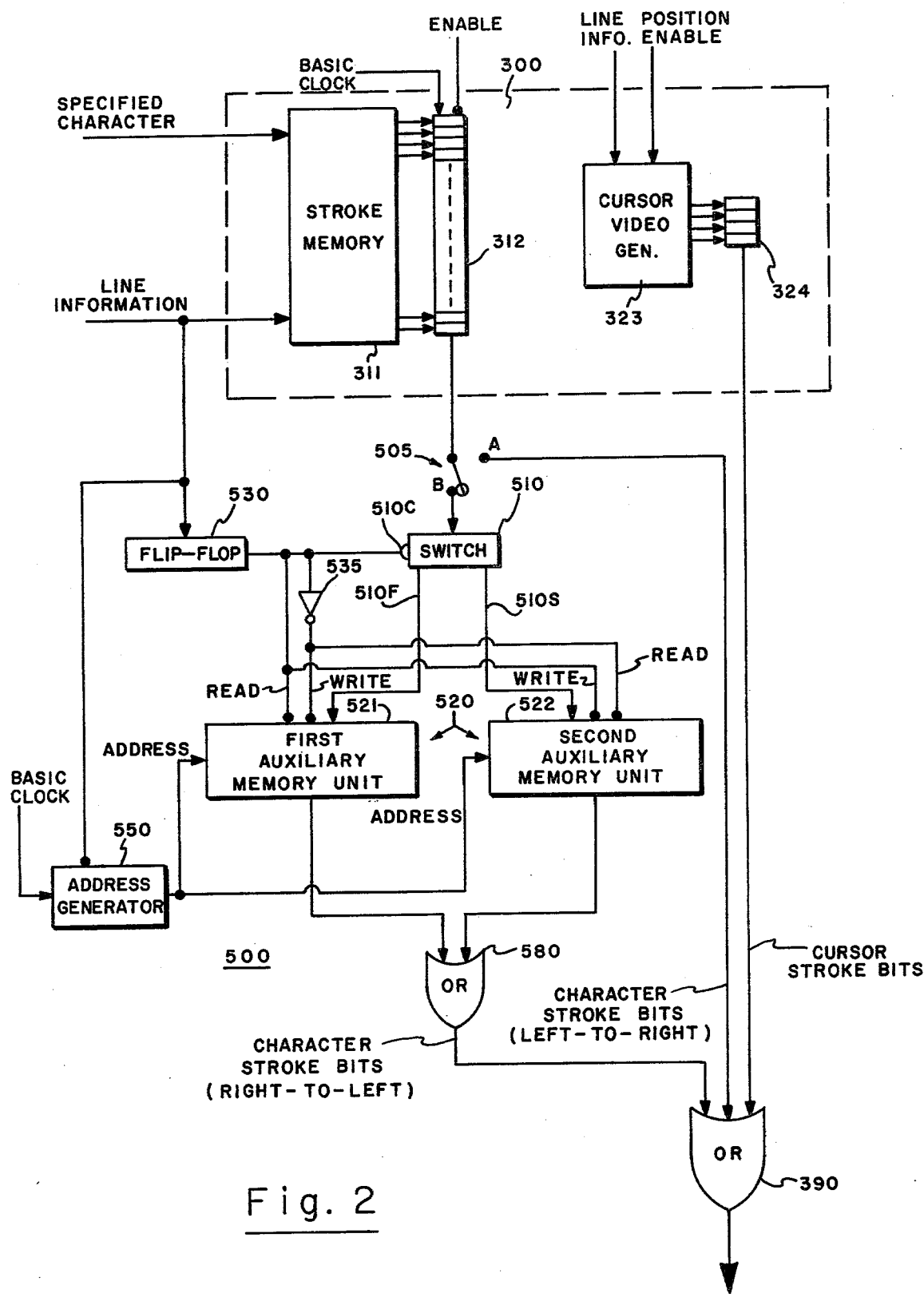
FIG. 2 is a block diagram of a subsystem in accordance with an embodiment of the invention, shown in conjunction with a portion of the FIG. 1 apparatus.

Referring to FIG. 2, there is shown an embodiment of the improvement in accordance with the invention. The stroke generator 300, shown in dashed line, is in accordance with the stroke generator disclosed in the above-referenced U.S. Pat. No. 3,740,743. In particular, the stroke generator includes a stroke memory 311 that is utilized to generate the stroke bits for the specified character, and a cursor video generator 323 which may merely be another ROM or RAM which is utilized, in known fashion, for generating stroke bits needed to present the cursor dot on the ultimate display. Each of these memories operates by generating a plurality of output bits in parallel and coupling these output bits to a shift register, the bits then being clocked out of the shift register in serial fashion. In the case of stroke memory 311, and as is described in full detail in the above-referenced U.S. Pat. No. 3,740,743, the memory is responsive to the specified character and the particular line (or "slice") of the character being formed, to produce up to thirty-three parallel output bits which are coupled to a shift register 312. These bits are then clocked out of the shift register 312 in serial fashion using the system's basic clock. An enabling signal from the timing circuitry 200 (FIG. 1) initiates this readout. The cursor video generator 323 includes a memory that is responsive to the scanline and horizontal position of the cursor reference (which is under operator control). During each television field, the stroke bits representing a slice of a dot are therefore produced by memory 323 when the scan position corresponds to the operator-designated cursor reference position. The resultant stroke bits (four in number) are fed in parallel to four stage shift register 324. These stroke bits are then clocked out of shift register 324, and are combined with the character-representative stroke bits by OR gate 390.

To this point in the description of FIG. 2, the structure and operation have been consistent with that set forth in the above-referenced U.S. Pat. No. 3,740,743. In accordance with the present invention, there is provided a subsystem 500 for presenting characters of a language which reads right-to-left. A switch 505 is provided and couples the output of shift register 312 to either the OR gate 390 (switch position A of switch 505) or to another switch 510 (switch position B of switch 505). For switch position B, operation is conventional and is as previously described, the OR gate 390 serving to combine the character and cursor stroke bits. This would be the case, for example, when a set of alphanumeric characters for a left-to-right languate is loaded into stroke memory 311. For operation of the equipment with a language which reads right-to-left, the stroke member 311 is first loaded with mirror (or "reverse") image renditions of the alphanumeric characters to be presented. As previously stated, stroke memory 311 may comprise a RAM or a ROM. If the stroke memory 311 is a RAM or a programmable ROM, the unit can be simply loaded with the appropriate stroke information for mirror images of the alphanumeric characters (these merely being the reverse of the strokes that would normally be stored for each character). If stroke memory 311 is a non-programmable ROM, it will be initially designed with the mirror image stroke information. In either case, it will be understood that a separate memory (or an allocation of a portion of the existing memory) could, if desired, be provided for the right-to-left language alphanumerics. It is preferred, however, that stroke memory 311 comprise a RAM which can readily be loaded with the appropriate stroke information.

The switch 510 has first and second outputs designated as 510F and 510S, respectively. These outputs are coupled to auxiliary storate 520 which includes a first auxiliary memory unit 521 and a second auxiliary memory unit 522. Depending upon the level of a signal attached to the control input 510C of switch 510, the output of the switch 510 is coupled to either one or the other of the auxiliary memory units 521 and 522. The control input 510C of switch 510 receives the output of a flip-flop 530 which, in turn, is triggered to change state at each new scanline. Accordingly, the output of flip-flop 530 changes state at the beginning of each new scanline. The output of flip-flop 530 is also coupled to the "read in" enable of the memory unit 521 and to the "read out" enable of the memory unit 522. The output of flip-flop 530 is further coupled to an inverter 535 whose output is coupled to the "read out" enable of memory unit 521 and to the "read in" enable of memory unit 522. In this manner, it is seen that during a particular scanline the output of shift register 312 will be coupled to the first auxiliary memory unit 521 while this auxiliary memory unit is enabled to read in and store the new information. At the same time, the second auxiliary memory unit will be enabled to read out the information which was stored therein during the previous scanline. At the beginning of the next scanline, the memory units 521 and 522 reverse roles with the second auxiliary memory unit 522 receiving the stroke bit information from shift register 312 while the first auxiliary memory unit 521 reads out the stroke bit information stored during the previous line. The outputs of the memory units 521 and 522 are combined by OR gate 580 whose output is, in turn, combined with the cursor stroke bits by OR gate 390.

In the present embodiment, the first and second auxiliary memory units 521 and 522 are RAMs (or different portions of the same RAM) and addresses for these memories are provided by an address generator 550. The address generator 550 comprises a counter which, when enabled, counts clock pulses up to a predetermined number "N" which equals the number of clock pulses in a scanline. Upon being enabled by the next scanline, the counter then counts back down toward zero. In this manner, during every other scanline successively higher addresses are generated, whereas during the alternating scanlines successively lower addresses are generated. Since the memory units 521 and 522 read and then write during successive scanlines (although out of phase with each other), this means that the information stored in each of these memory units will be read out on a "last-in-first-out" basis; i.e., in reverse order from the order in which information was read in.

In operation, using the right-to-left language circuitry of the present invention (position B of switch 505), the strokes of characters read out of stroke memory 311 will actually be presented on the ultimate display from left-to-right. However, as the stroke bits for each character are read out of the stroke memory they will be accumulated in one of the auxiliary memory units in the order in which they are received. The full scanline will then (while the next scanline is being read into the other auxiliary memory unit) be read out in the opposite order to which it was read in. Accordingly, the characters, although actually presented on the display using a left-to-right scan and stroke presentation, will be in correct right-to-left order. The reversal of each character's orientation, as a result of this process, is taken account of by originally loading the mirror image renditions of the characters into the stroke memory 311, as previously described. Also, since characters will now be entered into the display in respect to a right-to-left reference, the cursor reference should be reversed, this being readily achieved by substituting a downcount for the conventional upcount in the timing circuitry 200 (FIG. 1).

The invention has been described with reference to a particular embodiment, but variations within the spirit and scope of the invention will occur to those skilled in the art. For example, while the auxiliary memory has been described in terms of a RAM, it will be understood that any suitable memory can be employed. For example, the auxiliary memory units could comprise shift registers which are clocked in one way and clocked out the opposite way so as to obtain a last-in-first-out operation. In such instance, the address generator 550 would not be required. It will be further understood that color character information can be handled in the same manner as that generally described. In the case of color information, and since the bandwidth thereof is substantially lower than the television luminance bandwidth, it will be understood that operation can be effected at a lower clock rate and with less storage capability.

I claim:

1. In an apparatus for receiving a sequence of character-representative signals and for generating video control signals which are suitable for controlling a scanned display, said apparatus including timing generator means for generating timing signals which are synchronized with the display scan; character storage means for storing the character-representative signals and periodically reading out character-representative signals which correspond to a character in the sequence; and stroke generator means responsive to the timing signals and the character-representative signals for producing stroke bits of the character to be displayed; a compatible subsystem for presenting characters of a language which reads right-to-left, comprising:

means for storing, in said stroke generator means, reverse image stroke representations of a font of characters of said language;
auxiliary storage means for storing a scanline of stroke bits from said stroke generator means; and
means for reading out said scanline of stroke bits from said auxiliary storage means, said scanline of stroke bits being read out in reverse order from the order in which they were read into said auxiliary storage means.

2. The subsystem as defined by claim 1 wherein said auxiliary storage means comprises first and second storage means which are alternately operable to read in and read out successive scanlines of stroke bits so that one scanline of stroke bits is being read out while the next scanline of stroke bits is being read in.

3. The subsystem as defined by claim 1 wherein said auxiliary storage means comprises at least one random access memory.

4. The subsystem as defined by claim 2 wherein each of said first and second storage means is a random access memory unit.

5. For use in conjunction with an apparatus which receives a sequence of character-representative signals and generates video control signals which are suitable for controlling a scanned display, said apparatus including timing generator means for generating timing signals which are synchronized with the display scan; character storage means for storing the character-representative signals and periodically reading out character-representative signals which correspond to a character in the seqeunce; and stroke generator means responsive to the timing signals and the character-representative signals for producing stroke bits of the character to be displayed; a method for presenting characters of a language which reads right-to-left, comprising the steps of:

storing, in said stroke generator means, reverse image stroke representations of a font of characters of said language;
storing a scanline of stroke bits from said stroke generator means; and
reading out said scanline of stroke bits in reverse order from the order in which they were stored.

6. The method as defined by claim 5 wherein said storing and reading out steps comprise storing successive scanlines of stroke bits and reading out one scanline of stroke bits while the next scanline of stroke bits is being read in.

7. Apparatus for receiving a sequence of character-representative signals and for generating video control signals which are suitable for controlling a scanned display, said apparatus including a compatible subsystem for presenting characters of a language which reads right-to-left, comprising:

timing generator means for generating timing signals which are synchronized with the display scan;
character storage means for storing the character-representative signals and periodically reading out character-representative signals which correspond to a character in the sequence;
stroke generator means responsive to the timing signals and the character-representative signals for producing stroke bits of the character to be displayed;
means for storing, in said stroke generator means, reverse image stroke representations of a font of characters of said language;
auxiliary storage means for storing a scanline of stroke bits from said stroke generator means; and
means for reading out said scanline of stroke bits from said auxiliary storage means, said scanline of stroke bits being read out in reverse order from the order in which they were read into said auxiliary storage means.

8. Apparatus as defined by claim 7 wherein said auxiliary storage means conprises first and second storage means which are alternately operable to read in and read out successive scanlines of stroke bits so that one scanline of stroke bits is being read out while the next scanline of stroke bits is being read in.

9. Apparatus as defined by claim 7 wherein said auxiliary storage means comprises at least one random access memory.

10. Apparatus as defined by claim 8 wherein each of said first and second storage means is a random access memory unit.

* * * * *

UNITED STATES PATENT AND TRADEMARK OFFICE
CERTIFICATE OF CORRECTION

PATENT NO. : 4,205,310
DATED : May 27, 1980
INVENTOR(S) : Renville H. McMann, Jr., et al It is certified that error appears in the above-identified patent and that said Letters Patent are hereby corrected as shown below:

Col. 5, line 34, change "B" to --A--.

Col. 5, line 61, change "storate" to --storage--.

Col. 8, line 3, change "seqeunce" to --sequence--.

Col. 8, line 48, change "comprises" to --comprise--.

Signed and Sealed this

Ninth Day of September 1980

[SEAL]

Attest:

SIDNEY A. DIAMOND

Attesting Officer         Commissioner of Patents and Trademarks